United States Patent Office 3,007,104
Patented Oct. 31, 1961

3,007,104
ELECTRICAL CONTROL APPARATUS
John N. Easterbrook, Birmingham, Mich., assignor to Westinghouse Electric Corporation, East Pittsburgh, Pa., a corporation of Pennsylvania
Filed Dec. 30, 1957, Ser. No. 706,037
9 Claims. (Cl. 322—27)

This invention relates to electrical control apparatus and more particularly to regulator systems for dynamoelectric machines.

A problem arises in providing suitable control apparatus for certain types of dynamoelectric machines, such as a high frequency generator, disposed to supply electric power to an induction coil used for heating a workpiece or charge. It has been found that, initially, when the workpiece is cold, the load current supplied by such a generator tends to be excessive and then gradually decreases as the temperature of the workpiece increases. In order to maintain the output load current of such a generator at a predetermined value, such as the normal full load current of the generator, during the heating-up period of the workpiece, it is necessary to manually adjust the output voltage of the generator during the heating-up period. This can be done by manually adjusting the excitation current applied to the excitation field winding of the generator so that the output voltage of the generator is initially low and then by gradually increasing the excitation current and the output voltage of the generator. If a voltage regulator is associated with the generator, it is necessary to manually adjust the regulated value of the output voltage of the generator during this heating-up period. It is, therefore, desirable to provide control apparatus, such as a regulator system, for automatically maintaining the output load current of a generator at or below a predetermined value where the output current of the generator tends to vary widely.

It is an object of this invention to provide a new and improved regulator system for a dynamoelectric machine.

Another object of this invention is to provide a current regulator for a dynamoelectric machine which automatically adjusts the regulated value of voltage maintained by a voltage regulator associated with the machine to thereby maintain the output load current of the machine at or below a predetermined value.

Other objects of the invention will in part be obvious and will in part appear hereinafter.

Figure 1:
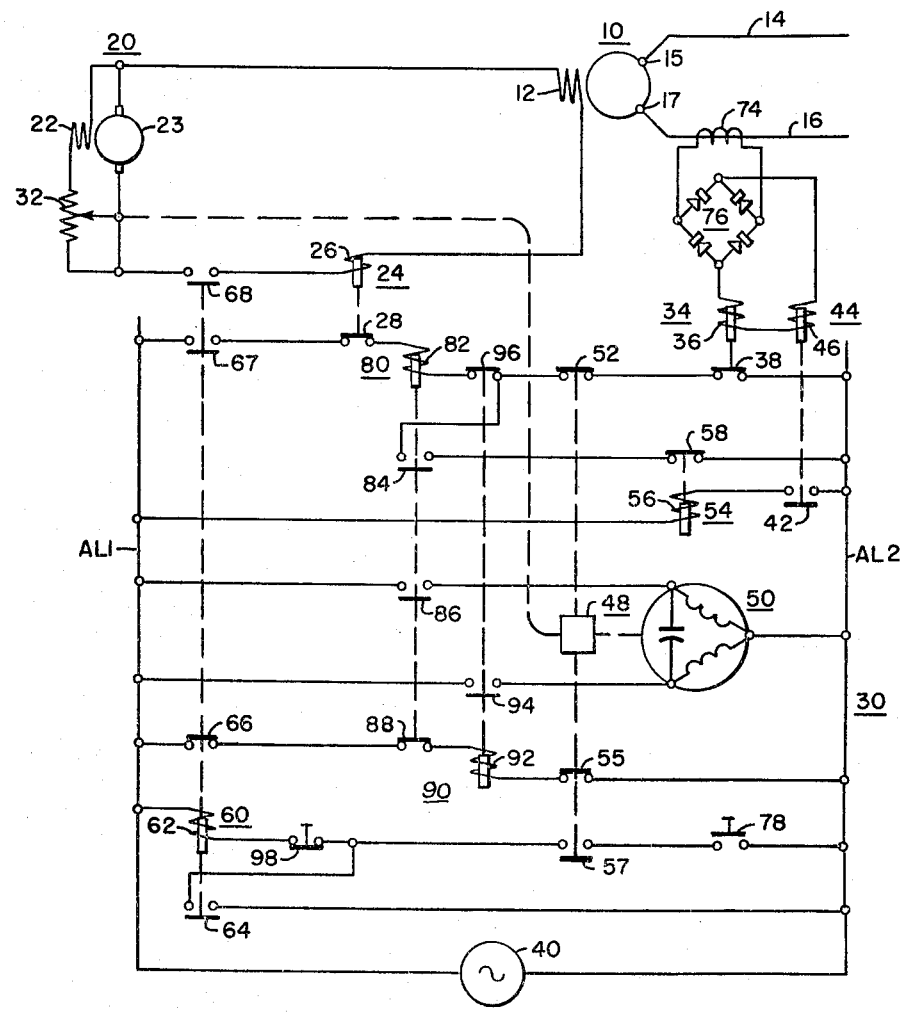
Figure 2:
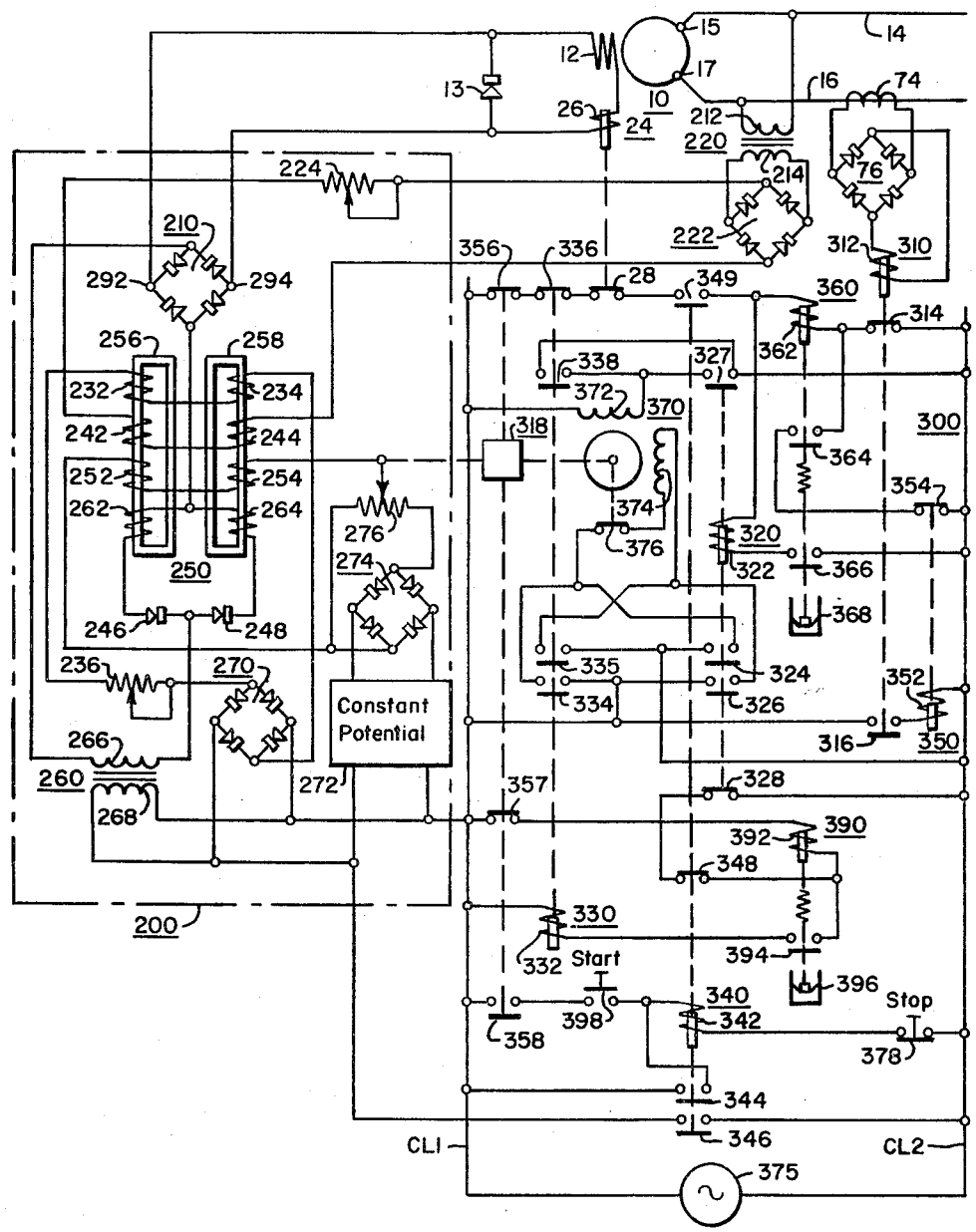

For a fuller understanding of the matter and objects of the invention, reference should be had to the following detailed description taken in connection with the accompanying drawings in which:

FIGURE 1 is a schematic diagram of circuits and apparatus illustrating one embodiment of this invention, and FIG. 2 is a schematic diagram of circuits and apparatus illustrating a second embodiment of this invention.

Referring now to the drawings and FIG. 1 in particular, there is illustrated a dynamoelectric machine, specifically an alternating current generator 10 having a field winding 12. In this instance, the generator 10 is disposed to supply electric power to the line conductors 14 and 16 through the output terminals 15 and 17 respectively. In order to obtain an excitation voltage across the field winding 12 of relatively large magnitude, an exciter 20 is provided. In this instance, the exciter 20 comprises an armature 23 which supplied current to the excitation field winding 12 of the generator 10 and a self-exciting winding 22 which is connected in series circuit relationship with the rheostat 32, the series circuit being connected in shunt with the armature 23. The field winding 12 of the generator 10 is connected across the armature 23 of the exciter 20 through the operating coil 26 of the current relay 24 and the normally open contact 68 of the contactor 60. The amount of excitation supplied by the exciter 20 to the field winding 12 of the generator 10 is determined by the setting of the motor operated rheostat 32 which is controlled by the reversible motor 50.

In order to maintain the output load current of the generator 10 at or below a predetermined value, a current regulator system 30 is interconnected between the output terminals 15 and 17 of the generator 10 and the field winding 22 of the exciter 20. The regulator system 30 comprises means responsive to the output load current of the generator 10, specifically the current relays 34 and 44, a raise relay 80, a lower relay 90 and the contactor 60. In general, the regulator system 30 controls the operation of the reversible motor 50 in accordance with the output load current of the generator 10 to control the excitation current applied to the field winding 12 of the generator 10 and thereby maintain the output load current of the generator 10 at or below a predetermined value. Energy for the regulator system 30 is derived from a suitable source of alternating current voltage 40 which is connected between the conductors AL1 and AL2. The contacts of the various relays included in the regulator system 30 are shown in their normal positions in FIG. 1 for the condition when the operating coil of each associated relay is deenergized.

In describing the regulator system 30, it is assumed that initially the operating coil 62 of the contactor 60 is deenergized and that the normally closed contact 66 of the contactor 60 is closed. The operating coil 92 of the lower relay 90 will then be energized with a closed circuit formed from the conductor AL1, through the normally closed contact 66 of the contactor 60, through the normally closed contact 88 of the raise relay 80, and through the lower limit switch 55 to the conductor AL2. The lower limit switch 55 is actuated by a suitable gearing or cam means 48 which is actuated in turn by the reversible motor 50. When the lower relay 90 is energized the normally closed contact 96 of the relay 90 which is connected in series circuit relationship with the operating coil 82 of the raise relay 80 will open and the normally open contact 94 of the lower relay 90 will close, thus energizing the reversible motor 50 which will then be connected across the conductors AL1 and AL2. The reversible motor 50 will then change the setting of the rheostat 32 in such a direction as to lower the excitation current applied to the field winding 12 of the generator 10 until the cam means 48 actuates the lower limit switches 55 and 57 which will then open and close respectively. When the lower limit switch 55 opens, the operating coil 92 of the lower relay 90 will be deenergized, thus opening the normally open contact 94 of the lower relay 90 and deenergizing the reversible motor 50. Thus, whenever the contactor 60 is deenergized, the lower relay 90 will be energized to return the setting of the rheostat 32 to a lower limit, thus opening the lower limit switch 55 and closing the lower limit switch 57 which are actuated by the cam means 48.

In order to supply excitation current to the field winding 12 of the generator 10 initially, it is necessary to close or push the start push-button 78. A closed circuit is then formed between the conductors AL1 and AL2, through the operating coil 62 of the contactor 60, through the normally closed stop push-button 98, through the lower limit switch 57 and the start push-button 78. The lower limit switch 57 will be closed initially since the lower relay 90 operates as previously described to return the setting of the rheostat 32 to its lower limit whenever the contactor 60 is deenergized. After the contactor 60 is energized, the normally open holding contact 64 of the contactor 60 will close to provide a holding circuit in parallel with the series circuit which includes the lower limit switch 57 and the start push-button 78. The normally closed contact 66 of the contactor 60, which is connected in series circuit relationship with the operating coil 92 of the lower relay 90, will then open to prevent the lower relay 90 from being energized. The normally open contacts 67 and 68 of the contactor 60 will close. When the contact 68 closes, the exciter 20 will then be connected to provide excitation current to the field winding 12 of the generator 10.

After the contactor 60 is energized and its normally open contact 67 closes, the raise relay 80 will be energized with a closed series circuit being formed between the conductors AL1 and AL2 by the contact 67 of the contactor 60, the normally closed contact 28 of the current relay 24, the operating coil 82 of the raise relay 80, the normally closed contact 96 of the lower relay 90, the upper limit switch 52 which is actuated by the cam means 48, and the normally closed contact 38 of the current relay 34. When the raise relay 80 is energized, the normally open holding contact 84 of the relay 80 closes to form, with the normally closed contact 58 of the auxiliary relay 54, a holding circuit in parallel with the series circuit which includes upper limit switch 52 and the normally closed contact 38 of the current relay 34. The normally closed contact 88 of the relay 80, connected in series circuit relationship with the operating coil 92 of the lower relay 90, will then open to prevent the lower relay 90 from being energized while the raise relay 80 is energized. The normally open contact 86 of the raise relay 80 will close to energize the reversible motor 50 across the conductors AL1 and AL2 in such a direction as to increase the excitation supplied by the exciter 20 to the field winding 12 of the generator 10. The current relay 24 is provided with its operating coil 26 connected in series circuit relationship with the field winding 12 to operate at a predetermined maximum value of excitation current and open the normally closed contact 28, thus deenergizing the raise relay 80 when the predetermined maximum value of excitation current is reached. The upper limit switch 52 is provided in series circuit relationship with the operating coil 82 of the raise relay 80 in order to open when a predetermined upper limit is reached on the setting of the rheostat 32 and thus deenergize the raise relay 80 when the upper limit on the setting of the rheostat 32 is reached.

After the contactor 60 is energized and the raise relay 80 in turn is energized to increase the excitation current supplied to the field winding 12 of the generator 10, the output load current of the generator 10 flowing in the line conductors 14 and 16 will also increase. The current transformer 74 is disposed in circuit relationship with the line conductor 16 to be responsive to the output load current of the generator 10. The output current of the current transformer 74 is connected across the input of the full wave rectifier 76. The operating coils 36 and 46 of the current responsive relays 34 and 44 respectively are connected in series circuit relationship, the series circuit being connected across the output terminals of the full wave rectifier 76. The current relay 44 includes a normally open contact 42 which closes when the output load current of the generator 10 reaches a maximum predetermined value. The current relay 34 is selected or adjusted so that the normally closed contact 38 of the current relay 34 opens when the output load current of the generator 10 reaches a value just below the output load current at which the current relay 44 operates. After the raise relay 80 is energized, the output load current of the generator 10 increases until the current relay 34 operates to open the normally closed contact 38. The raise relay 80 continues to be energized after the contact 38 opens through the holding contact 84 and the normally closed contact 58 of the auxiliary relay 54. As the output load current of the generator 10 increases further, the current relay 44 will operate when the output current reaches the maximum predetermined value and close the normally open contact 42 of the relay 44, thus energizing the auxiliary relay 54 by connecting the operating coil 56 of the relay 54 between the conductors AL1 and AL2. When the auxiliary relay 54 is energized, the normally closed contact 58 of the relay 54 will open, thus deenergizing the raise relay 80. If the output load current of the generator 10 then decreases to a value below the current necessary to operate the current relay 34, the normally closed contact 38 of the relay 34 will close and the raise relay 80 will again be energized to cause a corresponding increase in the excitation current supplied by the exciter 20 to the field winding 12 of the generator 10.

In general, the operation of the regulator system 30 as just described, is to maintain during the warm-up period of the workpiece the output load current of the generator 10 at a value between the predetermined current required to operate the current relay 44 and the predetermined current just below the latter value required to operate the current relay 34. It is to be understood that a single current relay could be substituted for the current relays 34 and 44 in a regulator system embodying the teachings of this invention. The use of the two current relays 34 and 44, however, permits by independent adjustment of the two relays 34 and 44, a more precise band of operation of the regulator system 30. It is to be noted that a stop push-button 98 is provided to remove excitation current from the field winding 12 of the generator 10 by deenergizing the contactor 60 whenever load is removed from the line conductors 14 and 16. As previously explained, the lower relay 90 functions or operates to return the setting of the rheostat 32 to its lower limit whenever the contactor 60 is deenergized, thus placing the regulator system 30 in condition for a new cycle of operation whenever load is connected to the line conductors 14 and 16 and the start push-button 78 is closed.

It is to be understood that current relays similar to the current relays 34 and 44 could be added to the regulator system 30 in order to control the lower relay 90 and provide for automatic lowering of the excitation current supplied to the field winding 12 of the generator 10 in order to maintain the output load current of the generator 10 at a predetermined value.

Referring now to FIG. 2, there is illustrated a regulator system 300 which is a second embodiment of a current regulator system incorporating the teachings of this invention in combination with a voltage regulator system 200. In general, the current regulator system 300 is connected in circuit relationship with the voltage regulator system 200 to automatically adjust or control the regulated value of output voltage of the generator 10 which is maintained by the voltage regulator system 200 in order to maintain the output load current of the generator 10 at a predetermined value. The reference numerals in FIG. 2 applicable to the same equipment as in FIG. 1 are the same.

The current regulator system 300 will be described first. In general, the current regulator system 300 is similar to the current regulator system 30 shown in FIG. 1 except for several differences. In the regulator system 300, a single current relay 310 is substituted for the two current relays 34 and 44 employed in the current regulator system 30. A different type of reversible motor 370 is employed in the current regulator system 300 rather than the reversible motor 50 employed in the current regulator system 30. In addition, the current regulator system 300 includes two time delay relays 360 and 390 in order to insure that the reversible motor 370 stops before the direction of rotation of the reversible motor 370 is reversed by the current regulator system 300.

Energy for the current regulator system 300 and the voltage regulator system 200 is derived from a suitable source of alternating current voltage 375 which is connected between the conductors CL1 and CL2. The contacts of the various relays included in the current regulator system 300 are shown in their normal positions when the operating coil of each associated relay is deenergized.

The current regulator system 300 comprises the current relay 310, the time delay relays 360 and 390, the raise relay 320, the lower relay 330, and the contactor 340. The current relay 310 corresponds to the current relays 34 and 44 shown in FIG. 1 and the contactor 340 corresponds to the contactor 60 shown in FIG. 1. The raise relay 320 and the lower relay 330 correspond to the raise relay 80 and the lower relay 90 respectively shown in FIG. 1. The gearing or cam means 318 and its associated contacts 356, 357 and 358 correspond to the cam means 48 and its associated contacts 52, 55 and 57 shown in FIG. 1. The reversible motor 370 is similar to the reversible motor 50 except that the reversible motor includes a separate running winding 372, a starting winding 374, and a centrifugal switch 376 connected in series circuit relationship with said starting winding which opens when the motor 370 reaches a predetermined speed.

It is assumed initially that the contactor 340 is deenergized and that the normally closed contact 348 of the contactor 340 is closed. When the contactor 340 is deenergized, the time delay relay 390 will be energized since a closed circuit will be formed between the conductors CL1 and CL2 by the series circuit which includes the lower limit switch 357 which is actuated by the cam means 318 associated with the reversible motor 370, the operating coil 392 of the time delay relay 390, the normally closed contact 348 of the contactor 340, and the normally closed contact 328 of the raise relay 320. When the time delay relay 390 is energized, the normally open contact 394 of the time delay relay 390 will close after a time delay determined by the setting of the dash pot 396 associated with the time delay relay 390. The lower relay 330 will then be energized since a closed circuit will be formed between the conductors CL1 and CL2 by the series circuit which includes the operating coil 332 of the lower relay 330, the contact 394 of the time delay relay 390, the normally closed contact 348 of the contactor 340, and the normally closed contact 328 of the raise relay 320. When the lower relay 330 is energized, the normally closed contacts 334, 335 and 338 of the lower relay 330 will close to energize the reversible motor 370 to change the setting of the variable resistance means, specifically the potentiometer 276, which is part of the voltage regulator system 200. In particular, when the contact 338 closes, the running winding 372 of the motor 370 will be connected between the conductors CL1 and CL2. The starting winding 374 of the motor 370 will be connected between the conductors CL1 and CL2 by the series circuit which starts at the conductor CL1 and then continues through the contact 334 of the lower relay 330, then through the centrifugal switch 376 and the starting winding 374, through the contact 335 of the lower relay 330 and then to the conductor CL2. After the reversible motor reaches a predetermined speed, the centrifugal switch 376 will open and remove or deenergize the starting winding 374. The running winding 372 of the reversible motor 370 will continue to be energized until a lower limit is reached on the setting of the potentiometer 276. The cam means 318 will then open the lower limit switch 357 and close the lower limit switch 358 which are both actuated by the cam means 318. When the lower limit switch 357, which is connected in series with the operating coil 392 of the relay 390, opens, the time delay relay 390 will be deenergized and its contact 394, which is connected in series with the operating coil 332, will open to deenergize the operating coil 332 of the lower relay 330. The contact 338 of the lower relay 330 will then open to deenergize the running winding 372 of the reversible motor 370. In summary, whenever the contactor 340 is deenergized, the time delay relay 390 and the lower relay 330 will operate to energize the motor 370 until the setting of the potentiometer 276 is returned to a lower limit.

In order to supply excitation current initially to the field winding 12 of the generator 10 as shown in FIG. 2, it is necessary to supply energy to the voltage regulator system 200 and to the current regulator system 300. This is done by energizing the contactor 340 by pushing or closing the start push-button 398 which is equivalent to the start push-button 78 shown in FIG. 1. Before the contactor 340 can be energized, the lower limit switch 358 must be closed, which means that the setting of the potentiometer 276 is at its lower limit. As previously described, the setting of the potentiometer 276 is returned to its lower limit whenever the contactor 340 is deenergized. As will be explained in detail hereinafter, when the setting of the potentiometer 276 is at its lower limit, the regulator system 200 will maintain the output voltage of the generator 10 at the line conductors 14 and 16 at a relatively low value.

After the start push-button 389 is closed, the contactor 340 will be energized since a closed circuit will be formed between the conductors CL1 and CL2 by the series circuit which includes the lower limit switch 358 which will be closed, the start push-button 398, the operating coil 342 of the contactor 340, and the normally closed stop push-button 378. When the contactor 340 is energized, the normally closed contact 348 will open and the normally open contacts 344, 346 and 349 of the contactor 340 will then close. The closing of the contact 344 will provide a holding circuit in parallel with the series circuit which includes the lower limit switch 358 and the start push-button 398. The closing of the contact 346 will close a connection from the conductor CL2 to the voltage regulator system 200 and apply energy to the voltage regulator system 200 which will then begin to supply excitation current at its output to the field winding 12 of the generator 10. The closing of the contact 349 of the contactor 340 will cause the time delay relay 360 to be energized with a closed series circuit being formed from the conductor CL1 through the upper limit switch 356 which is actuated by the cam means 318, through the normally closed contact 336 of the lower relay 330, through the normally closed contact 28 of the current relay 24, through the close contact 349 of the contactor 340, through the operating coil 362 of the time delay relay 360 and through the normally closed contact 314 of the current relay 310 to the conductor CL2. When the contactor 340 is energized, the normally closed contact 348 which is connected in series circuit relationship with the operating coil 332 of the lower relay 330 will open to prevent energization of the lower relay 330 while the contactor 340 is energized.

After the contactor 340 is energized and the time delay relay 360 is energized, the normally open contact 364 of the time delay relay 360 will close without a time delay and together with the normally closed contact 354 of the auxiliary relay 350 will form a holding circuit in parallel circuit relationship with the normally closed contact 314 of the current relay 310. In addition, when the time delay relay 360 is energized, its normally open contact 366 will close after a time delay determined by the dash pot 368 which is associated with the time delay relay 360. After the contact 366 closes, the raise relay 320 will be energized since a closed circuit will be formed between the conductors CL1 and CL2 by the series circuit which includes the upper limit switch 356, the normally closed contact 336 of the lower relay 330, the normally closed contact 28 of the current relay 24, the closed contact 349 of the contactor 340, the operating coil 322 of the raise relay 320, and the closed contact 366 of the time delay relay 360.

When the raise relay 320 is energized, the normally closed contact 328 of the relay 320, which is connected in series circuit relationship with the operating coil 332 of the lower relay 330, will open and the normally open contacts 324, 326 and 327 of the relay 320 will close. When the contact 327 of the raise relay 320 closes, the running winding 372 of the motor 370 will be connected across the conductors CL1 and CL2. When the contacts 324 and 326 of the raise relay 320 close, the starting winding 374 of the motor 370 will be energized by a closed circuit which starts at the conductor CL1, then continues through the contact 326 of the relay 320 and the running winding 374, through the centrifugal switch 376 and the contact 324 of the relay 320 to the conductor CL2. The reversible motor 370 will then be energized to rotate in such a direction that the setting of the potentiometer 276 in the voltage regulator system 200 will cause increased excitation current to be supplied to the the excitation field winding 12 of the generator 10. The centrifugal switch 376 will open at a predetermined speed to deenergize the starting winding 374 of the motor 370.

After the contactor 340 has been energized and the raise relay 320 has been energized, the voltage regulator system 200 will begin to supply excitation current to the field winding 12 and the excitation current will be gradually increased to thereby increase the output voltage and the output current of the generator 10. In similar fashion to the current regulator system 30, the current transformer 74 is disposed in circuit relationship with the line conductor 16 to be responsive to the output load current of the generator 10. The output of the current transformer 74 is connected across the input terminals of the full wave rectifier 76. The operating coil 312 of the current relay 310 is connected across the output terminals of the full wave rectifier 76 to be responsive to the output load current of the generator 10. After the raise relay 320 is energized, the output load current of the generator 10 will gradually increase and as the output current of the generator 10 increases, the normally closed contact 314 of the current relay 310 will open first at a preselected value of output load current of the generator 10. The normally closed contact 314 is connected in series circuit relationship with the operating coil 362 of the time delay relay 360, but the time delay relay 360 will continue to be energized through the holding circuit which includes the contact 364 of the relay 360 and the normally closed contact 354 of the auxiliary relay 350 even though the contact 314 opens. As the output load current of the generator 10 increases further to a larger preselected value, the normally open contact 316 of the current relay 310 will then close to energize the operating coil 352 of the auxiliary relay 350 across the conductors, CL1 and CL2. When the auxiliary relay 350 is energized, the normally closed contact 354 of the auxiliary relay 350, which is part of the holding circuit of the relay 360, will then open and, since the contact 314 of the current relay 310 is already open, the operating coil 362 of the time delay relay 360 will be deenergized. When the time delay relay 360 is deenergized, the contact 366 of the time delay relay 360, which is connected in series circuit relationship with the operating coil 322 of the raise relay 320, will then open, thus deenergizing the raise relay 320. When the raise relay 320 is deenergized, the normally open contacts 324, 326 and 327 will then open to deenergize the reversible motor 370.

The raise relay 320 remains deenergized unless the output load current of the generator 10 decreases to a value less than the current required to open the contact 314 and close the contact 316 of the relay 310. If the output load current of the generator 10 decreases to such a value, the raise relay 320 will again be energized in the manner just described. In summary, the regulator system 320 operates to maintain the output load current of the generator 10 between two predetermined values during the warm-up period of the workpiece. The band of operation of the current regulator system 300 is determined by the predetermined current required to close the contact 316 of the current relay 310 and the slightly smaller value of current, below which the contact 314 of the current relay 310 closes. As stated previously, the time delay relays 360 and 390 are provided to insure that the reversible motor 370 comes to a stop before the connections to the starting winding 374 are reversed by a change in operation from the raise relay 320 to the lower relay 330 or vice versa. It should be noted that the upper limit switch 356 which is actuated by the cam means 318 associated with the motor 370 is provided to prevent a change in the setting of the potentiometer 276 beyond a safe upper limit. The stop push-button 378 is provided to deenergize the contactor 340 when the load is removed from the line conductors 14 and 16 at the output terminals 15 and 17 of the generator 10.

The voltage regulator system 200 will now be described. In general, the voltage regulator system 200, which includes the magnetic amplifier 250, is interconnected between the output terminals 15 and 17 of the generator 10 and the field winding 12 to control the excitation current applied to the field winding 12 to thereby maintain the output voltage of the generator 10 at a predetermined value.

As illustrated, the magnetic amplifier 250 is of standard construction and comprises two magnetic core members 256 and 258. In this instance, the load windings 262 and 264 are disposed in inductive relationship with the magnetic core members 256 and 258 respectively. As is customary, self-saturation for the magnetic amplifier 250 is obtained by connecting in series circuit relationship with the load windings 262 and 264, the self-saturating rectifiers 246 and 248 respectively. In order to form a doubler circuit of the magnetic amplifier 250, the series circuit including the load winding 262 and the self-saturating rectifier 246 is connected in parallel circuit relationship with the series circuit including the load winding 264 and the self-saturating rectifier 248.

Energy for the load windings 262 and 264 is received from a transformer 260, having a primary winding 268 which is connected to the conductor CL1 and to the conductor CL2 through the contact 346 of the contactor 340 when the contactor 340 is energized, and a secondary winding 266. As illustrated, a full wave dry type load rectifier 210 is interconnected with the hereinbefore described parallel circuit of the magnetic amplifier 250 and with the secondary winding 266 of the transformer 260 in order to produce a unidirectional current output for the magnetic amplifier 250. In this instance, the field winding 12 of the generator 10 is responsive to the output of the load rectifier 210, the field winding 12 being connected across the output terminals 292 and 294 of the rectifier 210 through the operating coil 26 of the current relay 24. A commutating rectifier 13 is connected across the field winding 12 in order to prevent the field winding 12 from interfering with the operation of the magnetic amplifier 12 by feeding back undesirable currents into the magnetic amplifier 250.

For the purpose of biasing the magnetic amplifier 250 a predetermined amount, the bias windings 232 and 234 are disposed in inductive relationship with the magnetic core members 256 and 258 respectively. In particular, the bias windings 232 and 234 are connected in series circuit relationship with one another, the series circuit being connected across the output terminals of a full wave rectifier 270 through the rheostat 236. The input terminals of the full wave rectifier 270 are connected between the conductors CL1 and CL2 through the contact 346 of the contactor 340 when the contactor 340 is energized. In operation the current flow through the bias windings 232 and 234 produces a magnetomotive force in the respective magnetic core members that opposes the magnetomotive force produced in the magnetic core members by the current flow through the load windings 262 and 264 respectively.

In order to obtain a reference point from which to operate in the magnetic amplifier 250, the reference windings 252 and 254 are disposed in inductive relationship with the magnetic core members 256 and 258 respectively. The reference windings 252 and 254 are so disposed on their respective magnetic core members 256 and 258 that the current flow through the reference windings 252 and 254 produces a magnetomotive force that opposes the magnetomotive force produced by the respective bias windings 232 and 234 respectively. As illustrated, the reference windings 252 and 254 are connected in series circuit relationship with one another, the series circuit being connected in parallel circuit relationship with the left portion of the potentiometer 276 whose setting is determined by the reversible motor 370. The potentiometer 276 is connected across the output terminals of a full wave dry type rectifier 274. In order that the current flow through the reference windings 252 and 254 remains substantially constant for a particular setting of the potentiometer 276, the input terminals of the rectifier 274 are connected to a constant potential or reference device 272 which produces at its output a substantially constant alternating current irrespective of the magnitude of the alternating current voltage at the conductors CL1 and CL2. The input of the constant potential device 272 is connected between the conductor CL1 and the conductor CL2 through the contact 346 of the contactor 340 whenever the contactor 340 is energized. The potentiometer 276 is provided in order that the reference point of the magnetic amplifier 250 may be controlled by the reversible motor 370, which in turn controls the regulated value at which the regulator system 200 maintains the output voltage of the generator 10.

The control windings 242 and 244 of the magnetic amplifier 250 are disposed in inductive relationship with the magnetic core members 256 and 258 respectively. The control windings 242 and 244 are connected in series circuit relationship with one another, the series circuit being connected to the output terminals of a full wave dry type rectifier 222 through the variable resistor 224. The input terminals of the rectifier 222 are connected to the line conductors 14 and 16 through a potential transformer 220, having a primary winding 212 connected across the conductors 14 and 16 and a secondary winding 214 connected across the input terminals of the rectifier 222.

The control windings 242 and 244 of the magnetic amplifier 250 are so disposed on the respective magnetic core members 256 and 258, that when current flows therethrough a magnetomotive force is produced in the respective magnetic core members that opposes the magnetomotive force produced by the current flow through the respective reference windings 252 and 254. The output voltage of the generator 10 is at its regulated value when the magnetomotive forces produced by the current flow through the control windings 242 and 244 are substantially equal to the respective magnetomotive forces produced by the current flow through the reference windings 252 and 254.

In the operation of the voltage regulator system 200, when the output voltage of the generator 10 increases to a value above its regulated value the current flow through the control windings 242 and 244 increases to thereby decrease the output current from the magnetic amplifiers 250 which is applied to the field winding 12 of the generator 10. The output voltage of the generator 10 then decreases to its regulated value. On the other hand, a decrease in the output voltage of the generator 10 to a value below its regulated value decreases the current flow through the control windings 242 and 244 of the magnetic amplifier 250. A decrease in the current flow through the control windings 242 and 244 increases the output current of the magnetic amplifier 250 applied to the field winding 12 of the generator 10 to thereby increase the output voltage of the generator 10 up to its regulated value. The regulated value of output voltage at which is maintained by the voltage regulator system 200 depends upon the current which flows in the reference windings 252 which, in turn, depends upon the setting of the potentiometer 276 which is controlled by the reversible motor 370. When the current flow through the reference windings 252 and 254 is increased by a change in the setting of the potentiometer 276, the regulated value of output voltage of the generator 10 which is maintained by the voltage regulator system 200 increases. On the other hand, when a change in the setting of the potentiometer 276 decreases the current which flows in the reference windings 252 and 254, the regulated value at which the voltage regulator system 200 maintains the output voltage of the generator 10 decreases.

The overall operation of the current regulator system 300 in combination with the voltage regulator system 200 will now be considered. In general, the current regulator system 300 adjusts the setting of the potentiometer 276 and the current which flows in the reference windings 252 and 254 of the magnetic amplifier 250 to automatically adjust the regulated value at which the voltage regulator system 200 maintains the output voltage of the generator 10 to thereby maintain the output load current of the generator 10 at a predetermined value. Initially, the operation of the current regulator system 300 will start with the setting of the potentiometer 276 at a lower limit. This is when the load on the generator 10 at the line conductors 14 and 16 tends to be excessive. As the load on the line conductors 14 and 16 decreases, the current regulator system 300 which is responsive to the output load current of the generator 10 will gradually increase the setting of the potentiometer 276 to thereby increase the regulated value at which the voltage regulator maintains the output voltage of the generator 10 to thereby increase the excitation current applied to the field winding 12 of the generator 10 and maintain the output load current of the generator 10 at a predetermined value. When the load on the generator 10 decreases to a relatively low value, the current regulator system 300 will increase the setting of the potentiometer 276 until the upper limit switch 356 opens to thereby de-energize the time delay relay 360 and the raise relay 320. The voltage regulator system 200 will then control the excitation current applied to the field winding 12 of the generator 10 in accordance with only the output voltage of the generator 10 to thereby maintain the output voltage of the generator 10 at a predetermined value.

It is to be understood that other types of suitable voltage regulator systems may be substituted for the voltage regulator system 200 shown in FIG. 2, assuming that a suitable means, such as a variable resistor, is provided by which the current regulator system 300 can automatically adjust the regulated value at which the voltage regulator system maintains the output voltage of the generator 10. It is also to be understood that a suitable direct-current or three-phase motor could be substituted for the alternating current motor 50 in FIG. 1 and for the alternating current motor 370 shown in FIG. 2 with the proper changes made in the type of control relays and supply voltage employed. As in the case with the current regulator system of FIG. 1, the current regulator system 300 can be used with alternating current or direct current generators and can be provided with additional current relays which would be connected in circuit relationship in a similar manner to the current relay 310 to provide for automatically lowering the excitation current applied to the field winding 12 of the generator 10 in order to maintain the output load current of the generator 10 at a predetermined value where the load tends to increase rather than decrease with time.

The apparatus embodying the teachings of the invention has several advantages. For example, the output load current of certain types of dynamoelectric machines may be automatically maintained at a predetermined value where the load on the dynamoelectric machine tends to be excessive initially, and then gradually decreases. In addition, a current regulator system embodying the teachings of this invention can be combined with a voltage regulator system to automatically adjust the regulated value at which the voltage regulator system maintains the output voltage of the dynamoelectric machine to thereby maintain the output load current of the machine at a predetermined value.

Since numerous changes can be made in the above described apparatus in circuits and different embodiments of the invention may be made without departing from the spirit thereof, it is intended that all the matter contained in the foregoing description or shown in the accompanying drawings shall be interpreted as illustrative and not in a limiting sense.

I claim as my invention:

1. In a current regulator system for a dynamoelectric machine having output terminals and an excitation field winding, the combination comprising first means connected in circuit relationship with said output terminals to be responsive to a predetermined value of output load current, second means connected in circuit relationship with said field winding to supply the excitation current thereto, variable resistance means including a motor drive connected in circuit relationship with said first means and said second means for controlling the excitation current supplied by said second means, said resistance means being connected to increase the excitation current supplied by said second means until said load current reaches said predetermined value, and a current relay connected in circuit relation with said field winding to be responsive to a predetermined maximum value of said excitation current for preventing said resistance means from increasing said excitation current.

2. In a regulator system for a dynamoelectric machine having output terminals and an excitation field winding, the combination comprising current responsive relay means connected in circuit relationship with said output terminals, said relay means having contacts which operate at a predetermined value of output load current of said machine, first means connected in circuit relationship with said field winding to supply the excitation current thereto, variable resistance means including a motor drive connected in circuit relationship with said first means and said contacts of said relay means for controlling the excitation current supplied by said first means to said field winding to thereby maintain said output load current at said predetermined value, and a current relay connected in circuit relation with said field winding to be responsive to a predetermined maximum value of said excitation current for preventing said resistance means from increasing said excitation current.

3. In a regulator system for a dynamoelectric machine having an excitation field winding and output terminals, the combination comprising a first current relay connected in circuit relationship with said output terminals to be responsive to a predetermined maximum value of output load current of said machine, first means connected in circuit relationship with said field winding for supplying the excitation current thereto, a motor driven rheostat connected in circuit relationship with said first relay and said field winding for controlling the excitation current supplied to said field winding, a second relay connected in circuit relationship with said first relay and said rheostat to energize said motor driven rheostat to increase said excitation current supplied to said field winding until said load current reaches said predetermined maximum value to thereby maintain said load current at said predetermined value, and a current relay connected in circuit relation with said field winding to be responsive to a predetermined maximum value of said excitation current for preventing said rheostat from increasing said excitation current.

4. In a regulator system for a dynamoelectric machine having an excitation field winding and output terminals connected to supply electric power to a load which is initially excessive and tends to gradually decrease, the combination comprising first means connected in circuit relationship with said field winding for supplying the excitation current thereto, variable resistance means connected in circuit relationship with said first means and said field winding including a motor drive for controlling the excitation current supplied by said first means to said field winding, a first current relay connected in circuit relationship with said output terminals to be responsive to a predetermined value of output load current of said machine, a second relay connected in circuit relationship with said first relay and said motor drive to energize said motor drive and increase the excitation current supplied to said field winding when said load current is below said predetermined value, and a current relay connected in circuit relation with said field winding to be responsive to a predetermined maximum value of said excitation current for preventing said resistance means from increasing said excitation current.

5. In a regulator system for maintaining the output load current of a dynamoelectric machine having an excitation field winding and output terminals between a minimum value and a maximum value, the combination comprising first means connected in circuit relationship with said field winding for supplying the excitation current thereto, variable resistance means including a motor drive connected in circuit relationship with said first means and said field winding for controlling the excitation current supplied by said first means to said field winding, a first current relay connected in circuit relationship with said output terminals to be responsive to a predetermined minimum value of load current of said machine, a second current relay connected in circuit relationship with said output terminals to be responsive to a predetermined maximum value of the load current of said machine, and a third relay connected in circuit relationship with said first and second relays for energizing said drive motor to increase said excitation current supplied to said field winding when said load current decreases to a value below said minimum value and for deenergizing said drive motor when said load current increases to a value above said maximum value.

6. In a regulator system for maintaining the output load current of a generator having an excitation field winding and output terminals between a minimum value and a maximum value, the combination comprising, first means connected in circuit relation with said field winding for supplying the excitation current thereto, variable resistance means including a motor drive connected in circuit relation with said first means and said field winding for controlling the excitation current supplied thereto by said first means, a source of electrical power, a raise relay connected in circuit relation with said source and said motor drive for energizing said motor drive when actuated to increase the excitation current supplied to said field winding, a lower relay connected in circuit relation with said source and said motor drive for energizing said motor drive when actuated to decrease the excitation current supplied to said field winding, a first current relay connected in circuit relation with said output terminals to be responsive to a predetermined minimum value of the load current of said machine, a second current relay connected in circuit relation with said output terminals to be responsive to a predetermined maximum value of the load current of said machine to actuate said raise relay and deenergize said motor drive to prevent any further increase in the excitation current supplied to said field winding, said first current relay being adapted to actuate said raise relay and energize said motor drive and increase said excitation current, and a contactor connected in circuit relation with said source and raise relay to actuate said raise relay when initially energized and increase said excitation current.

7. In a regulator system for maintaining the output load current of a generator having an excitation field winding and output terminals between a minimum value and a maximum value, the combination comprising, first means connected in circuit relation with said field winding for supplying the excitation current thereto, variable resistance means including a motor drive connected in circuit relation with said first means and said field winding for controlling the excitation current supplied thereto by said first means, a source of electrical power, a raise relay connected in circuit relation with said source and said motor drive for energizing said motor drive when actuated to increase the excitation current supplied to said field winding, a lower relay connected in circuit relation with said source and said motor drive for energizing said motor drive when actuated to decrease the excitation current supplied to said field winding, a first current relay connected in circuit relation with said output terminals to be responsive to a predetermined minimum value of the load current of said machine, a second current relay connected in circuit relation with said output terminals to be responsive to a predetermined maximum value of the load current of said machine to actuate said raise relay and deenergize said motor drive to prevent any further increase in the excitation current supplied to said field winding, said first current relay being adapted to actuate said raise relay and energize said motor drive and increase said excitation current, and a contactor connected in circuit relation with said source and raise relay to actuate said raise relay when initially energized and increase said excitation current, said lower relay being adapted to be actuated by said contactor whenever said contactor is deenergized to lower the excitation current supplied to said field winding.

8. In a regulator system for maintaining the output load current of a generator having an excitation field winding and output terminals between a minimum value and a maximum value, the combination comprising, first means connected in circuit relation with said field winding for supplying the excitation current thereto, variable resistance means including a motor drive connected in circuit relation with said first means and said field winding for controlling the excitation current supplied thereto by said first means, a source of electrical power, a raise relay connected in circuit relation with said source and said motor drive for energizing said motor drive when actuated to increase the excitation current supplied to said field winding, a lower relay connected in circuit relation with said source and said motor drive for energizing said motor drive when actuated to decrease the excitation current supplied to said field winding, a first current relay connected in circuit relation with said output terminals to be responsive to a predetermined minimum value of the load current of said machine, a second current relay connected in circuit relation with said output terminals to be responsive to a predetermined maximum value of the load current of said machine to actuate said raise relay and deenergize said motor drive to prevent any further increase in the excitation current supplied to said field winding, said first current relay being adapted to actuate said raise relay and energize said motor drive and increase said excitation current, a contactor connected in circuit relation with said source and raise relay to actuate said raise relay when initially energized and increase said excitation current, said lower relay being adapted to be actuated by said contactor whenever said contactor is deenergized to lower the excitation current supplied to said field winding, and upper and lower limit switches actuated by said motor drive to deenergize said raise and lower relays, respectively, when the upper and lower limits, respectively, of said variable resistance means are reached during the operation of said motor drive.

9. In a regulator system for maintaining the output load current of a generator having an excitation field winding and output terminals between a minimum value and a maximum value, the combination comprising, first means connected in circuit relation with said field winding for supplying the excitation current thereto, variable resistance means including a motor drive connected in circuit relation with said first means and said field winding for controlling the excitation current supplied thereto by said first means, a source of electrical power, a raise relay connected in circuit relation with said source and said motor drive for energizing said motor drive when actuated to increase the excitation current supplied to said field winding, a lower relay connected in circuit relation with said source and said motor drive for energizing said motor drive when actuated to decrease the excitation current supplied to said field winding, a first current relay connected in circuit relation with said output terminals to be responsive to a predetermined minimum value of the load current of said machine, a second current relay connected in circuit relation with said output terminals to be responsive to a predetermined maximum value of the load current of said machine to actuate said raise relay and deenergize said motor drive to prevent any further increase in the excitation current supplied to said field winding, said first current relay being adapted to actuate said raise relay and energize said motor drive and increase said excitation current, a contactor connected in circuit relation with said source and raise relay to actuate said raise relay when initially energized and increase said excitation current, and a third current relay connected in circuit relation with said field winding to be responsive to a predetermined maximum value of excitation current supplied to said field winding to actuate said raise relay to prevent any further increase in said excitation current.

References Cited in the file of this patent

UNITED STATES PATENTS

| | | |
|---|---|---|
| 1,666,471 | Seeley | Apr. 17, 1928 |
| 1,697,183 | Hardy | Jan. 1, 1929 |
| 1,776,151 | Hall | Sept. 16, 1930 |
| 2,297,578 | Noddings | Sept. 29, 1942 |
| 2,300,935 | Kovalsky | Nov. 3, 1942 |
| 2,727,694 | Helmick et al. | Dec. 20, 1955 |